No. 670,714. Patented Mar. 26, 1901.
G. S. LOWELL.
THRESHING CONCAVE AND TOOTH.
(Application filed June 19, 1900.)
(No Model.)
2 Sheets—Sheet 1.

UNITED STATES PATENT OFFICE.

GRANT S. LOWELL, OF KANSAS CITY, MISSOURI.

THRESHING CONCAVE AND TOOTH.

SPECIFICATION forming part of Letters Patent No. 670,714, dated March 26, 1901.

Application filed June 19, 1900. Serial No. 20,858. (No model.)

*To all whom it may concern:*

Be it known that I, GRANT S. LOWELL, a citizen of the United States, residing at Kansas City, in the county of Jackson and State of Missouri, have invented a new and useful Threshing Concave and Tooth, of which the following is a specification.

My invention relates to improvements in concaves and threshing-teeth for threshing-machines.

One object of my invention is to provide the concave of a threshing-machine with openings of such form and disposition with relation to the current of the grain passing over the concave as to prevent heads of grain from passing through the same, while permitting threshed grains to readily pass through the concave.

A further object of my invention is to provide a novel form of threshing-teeth for the concave and threshing-cylinder whereby when a head of grain wedges between coacting cylinder-teeth and concave-teeth the same instead of slipping between said coacting teeth without being threshed will be caught when only partly through the coacting teeth and further subjected to the threshing action of the teeth before escaping therefrom.

My invention consists in the arrangement and construction of devices hereinafter fully set forth, and pointed out in the claims.

Figure 1:
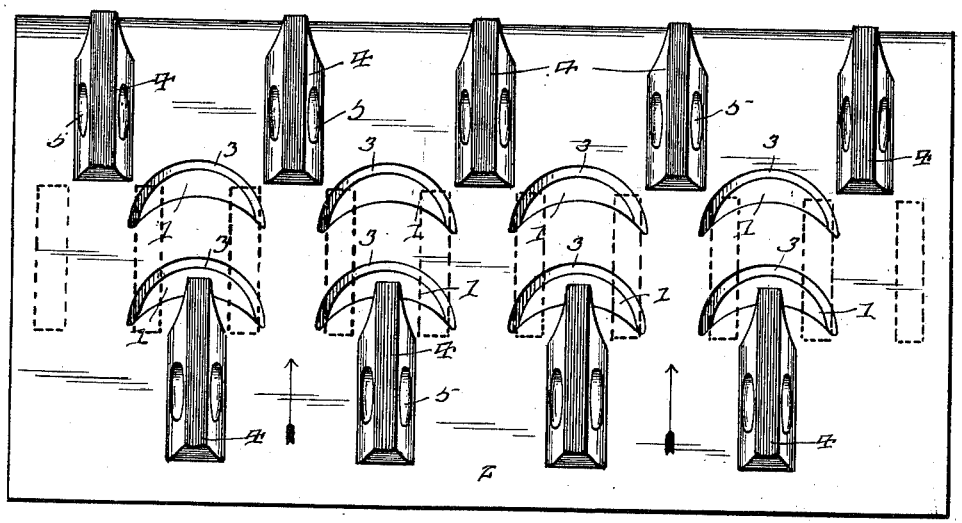
Figure 2:
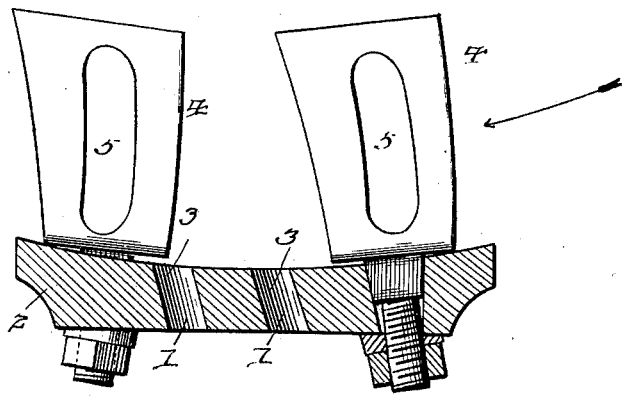
Figure 3:
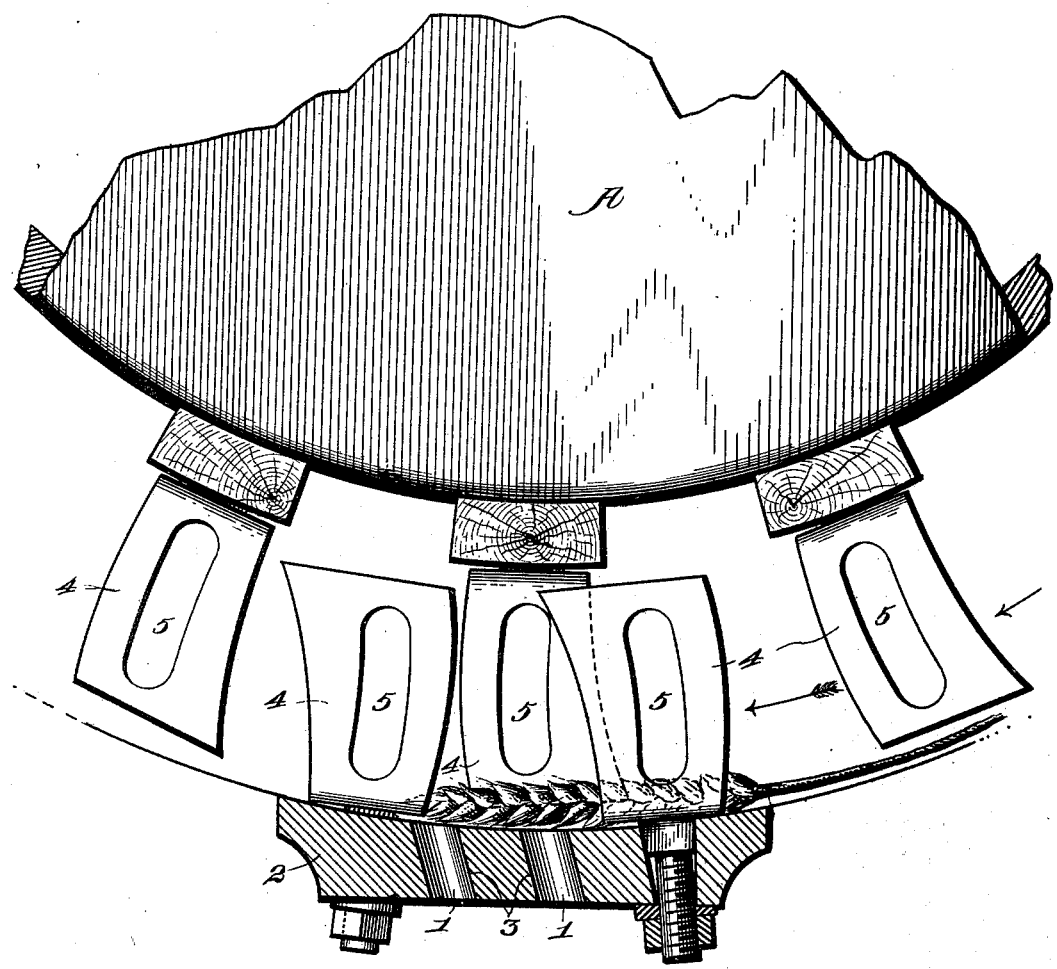

In the drawings, Figure 1 is a top plan view of a portion of a section of a concave embodying my improvements. Fig. 2 is a transverse sectional view of the same. Fig. 3 is partly an elevation and partly a sectional view showing my improved concave in operative relation to a threshing-cylinder.

The concaves of threshing-machines now on the market are not of maximum efficiency in the threshing of the variety of wheat raised principally in the southwestern portion of the United States and known as "turkey wheat," in that the openings in the concaves are of such size and shape as to allow whole heads of grain to pass through the concaves unthreshed, and hence to be fed from the machine to the straw-stack and wasted. To avoid this objection to machines of this class, I provide my improved concave with openings the axes of which are disposed at right angles to the plane of revolution of the threshing-cylinder and which openings depart in their contour from right lines.

As shown in Fig. 1 of the drawings, the openings 1 in the concave-section 2 are curved or of crescent shape, and the sides 3 of said openings incline downwardly toward the front side of the concave, said inclined sides being hence disposed opposite the plane of revolution of the threshing-cylinder and the current of the grain, (indicated by the arrows in the various figures of the drawings.) The said openings are of suitable size and are of greater length than width, in their longitudinal extent depart from right lines, and are so disposed that their chords or major axes are at right angles to the plane of revolution of the teeth of the threshing-cylinder A, and hence of the current of the grain as the same passes over the concave. The shape of the openings, while adapted to facilitate the passage of threshed grains therethrough from the concave, is such that whole heads of grain which are by the coacting cylinder and concave teeth disposed parallel with the plane of revolution of the cylinder-teeth will pass over the openings at an angle to their chords or major axes, and hence the whole heads of wheat which escape being threshed are prevented from passing through the openings of the concave. While the openings are here shown as being of crescent shape, that being the preferred form thereof, the shape of the openings may be modified without departing from the spirit of my invention.

In Figs. 1 and 2 of the drawings the cylinder-teeth are represented in dotted lines to illustrate the coaction of the cylinder and concave teeth in disposing such grains of wheat as escape being threshed in parallelism with the plane of revolution of the cylinder-teeth.

The openings 3 may be modified in form without departing from the spirit of my invention.

My improved threshing-teeth (indicated at 4) are used both on the concave and on the cylinder. Each of said teeth has flat sides and is provided with an opening 5, arranged substantially midway between the front and rear sides thereof and parallel, substantially, with the major axis of the tooth. The width of the said opening 5 is much less than the length of a head of wheat, so that the latter is prevented from passing transversely therethrough without being bent. The said openings form passages which extend transversely through the teeth, and when in the operation of the threshing-machine, as continually occurs, a head of grain becomes disposed parallel with the plane of revolution and with the coacting surfaces of opposing concave and cylinder teeth, which tend to move the head lengthwise between said opposing teeth, such endwise motion of the head of grain will be arrested by the opening 5 in one of the teeth, and in tending to pass through said opening the head of grain will be disposed at an angle to the plane of revolution and the grains will be stripped or threshed from the head, thus greatly enhancing the efficiency of the threshing mechanism.

I am aware that it has been heretofore proposed to provide a concave with teeth which are made in loop or staple form and with wide openings therein extending transversely through them. I am also aware that it has been heretofore proposed to provide a concave with plates forming teeth and which are provided on their sides with stiffening-ribs, which project beyond them, and with openings made transversely through the plates between the said stiffening-ribs. Such teeth and plates are, however, not adapted to perform the functions of my improved threshing-teeth for the cylinder and concave and are disclaimed herein.

Having thus described the invention, I claim—

1. The combination with a toothed threshing-cylinder, of a toothed concave having teeth arranged in rows in such manner that those in each succeeding row are placed in the planes of the intervals of the teeth of the preceding row at such spaces apart that the teeth of the cylinder pass freely between them, the surface of said concave being provided with openings in rear of, and longer than the width of each tooth, and arranged transversely to the lines of movements of the cylinder-teeth, the rear walls of said openings being curved to present oblique surfaces to the advance of the cylinder-teeth, substantially as described.

2. A cylinder and concave having intercurrent teeth with flat sides and provided with openings disposed longitudinally of the teeth and extending transversely through them, the width of such openings being less than the length of a head of wheat, substantially as described.

In testimony that I claim the foregoing as my own I have hereto affixed my signature in the presence of two witnesses.

GRANT S. LOWELL.

Witnesses:
J. D. WHITE,
A. E. ADAMS.